T. Stockton,
Bread Machine,

Nº 47,050.   Patented Mar. 28, 1865.

Attest:
Henry Morris
James P Hall

Inventor:
Thomas Stockton
per Munn & Co
Attorneys

UNITED STATES PATENT OFFICE.

THOMAS STOCKTON, OF NORTH SHENANGO, PENNSYLVANIA.

IMPROVED APPARATUS FOR RAISING DOUGH.

Specification forming part of Letters Patent No. 47,050, dated March 28, 1865.

*To all whom it may concern:*

Be it known that I, THOMAS STOCKTON, of North Shenango, in the county of Crawford and State of Pennsylvania, have invented a new and useful Improvement in Bread-Raising; and I do hereby declare that the following is a full, clear, and exact description thereof, which will enable others skilled in the art to make and use the same, reference being had to the accompanying drawings, forming part of this specification, in which—

Figure 1:
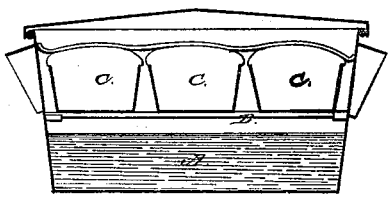
Figure 2:
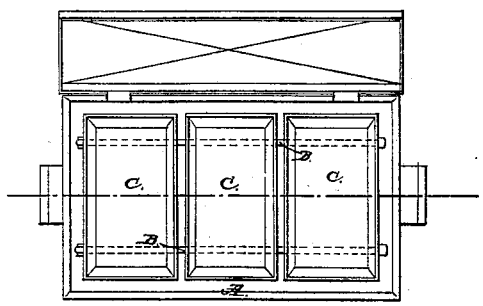

Figure 1 represents a side sectional elevation of my improvement; Fig. 2, a plan view of the same.

Similar letters of reference indicate like parts.

The design of this improvement is to facilitate, regulate, and promote the fermentation or "raising" of bread preparatory to the baking thereof.

After the yeast or other fermenting-mixture has been incorporated with the dough it is necessary that the temperature of the mass should be slightly increased, in order to promote fermentation.

The object of my invention is to supply the required heat in a gentle but expeditious manner.

I construct a water-tight covered vessel, A, of tin or other suitable material, and I arrange across the center thereof a perforated shelf, or a shelf composed of bars B B, as shown. Upon this shelf I place the dough-receptacles or baking-pans C C C, which are first filled with the dough to be fermented or "raised," and then covered with a cloth to prevent the condensation of moisture upon the surface of the dough. Any other suitable method of supporting the dough may be employed. I now pour into the bottom part of the vessel a body of warm water heated to a temperature of about 190° Fahrenheit, and I then close the cover of the vessel. In Fig. 1 the water is shown in red.

The heat arising from the water soon penetrates the mass of dough and promotes a rapid and uniform fermentation, after which the fermented dough is removed and baked in the common manner.

By the use of my improvement the dough can never be overheated, as its warmth can never rise above the temperature of the warm water.

My apparatus and process is simple, economical, and in the highest degree effective for the purpose intended.

I do not limit myself to the precise construction of parts here shown.

I do not claim, broadly, the application of heat to promote fermentation; but,

Having thus described my invention, I claim as new and desire to secure by Letters Patent—

The employment of a hot-water holder, A, in combination with the dough-receptacles C, supported by rods B above the level of the water, substantially in the manner and for the purpose herein shown and described.

THOMAS STOCKTON.

Witnesses:
S. P. WILLIS,
W. D. HUGHES.